Patented Oct. 28, 1930

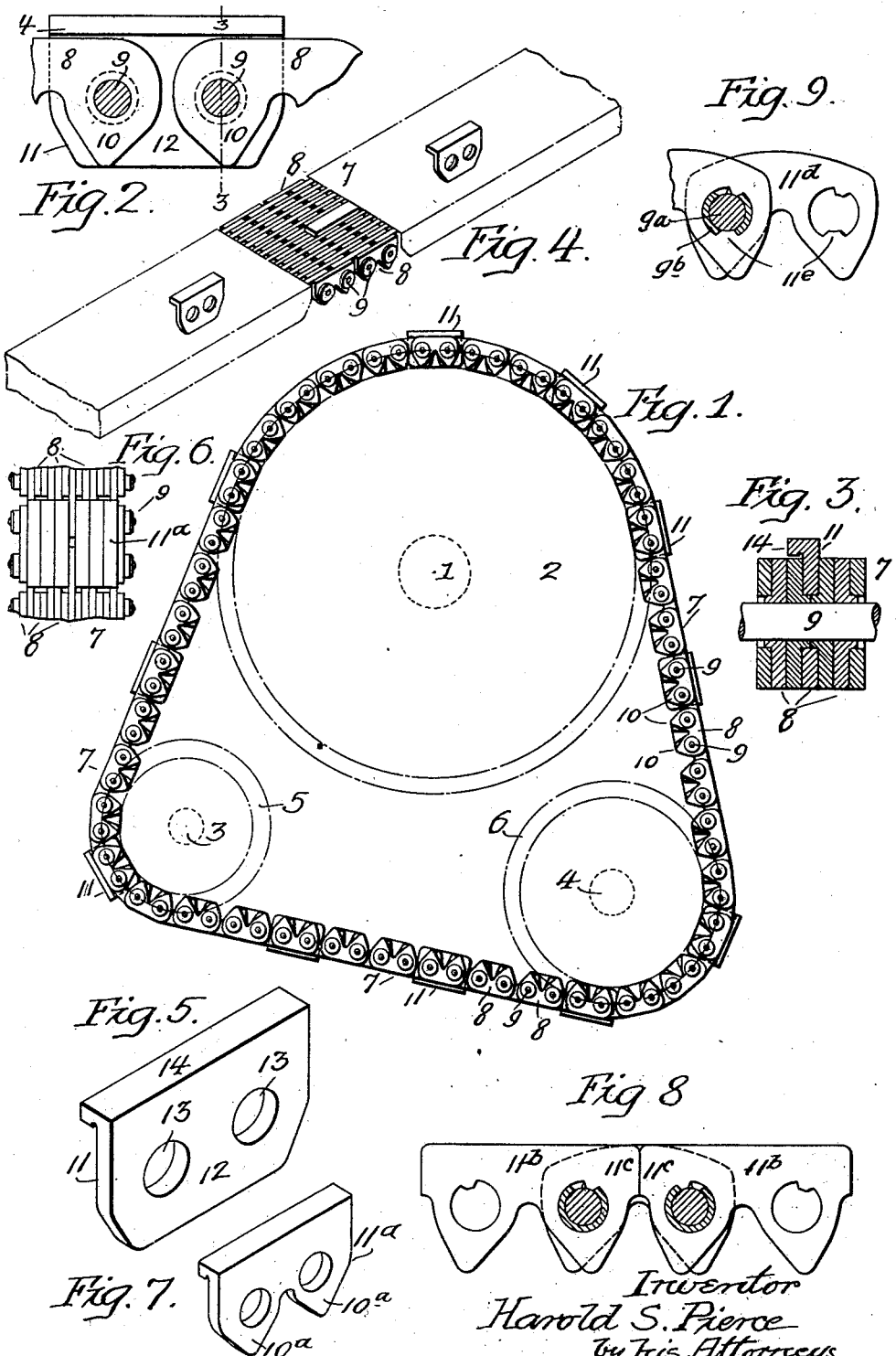

1,780,040

UNITED STATES PATENT OFFICE

HAROLD S. PIERCE, OF INDIANAPOLIS, INDIANA, ASSIGNOR TO LINK-BELT COMPANY, OF CHICAGO, ILLINOIS, A CORPORATION OF ILLINOIS

DRIVE CHAIN

Application filed September 11, 1926. Serial No. 134,916.

The object of my invention is to prevent or break-up the harmonic power impulses from building-up violent whipping in a drive-chain. The invention is particularly adapted to drive-chains of the multi-plate type known as "silent chains" used to drive the auxiliary parts of an automobile engine.

In the accompanying drawing:

Fig. 1 is a view of a drive-chain of an auxiliary drive of an automobile engine;

Fig. 2 is a sectional view of part of a drive-chain showing a check-link in position;

Fig. 3 is a sectional view on the line 3—3 Fig. 2;

Fig. 4 is a perspective view showing a section of drive-chain and a check-link;

Fig. 5 is a detached perspective view of the check-link;

Fig. 6 is a back view of a chain showing a series of check-links;

Fig. 7 is a perspective view of one of the check-links shown in Fig. 6; and

Figs. 8 and 9 are sectional views of links illustrating modifications of the invention.

Referring to Fig. 1 of the drawing, 1 is the crank-shaft of an automobile engine. 2 is a sprocket-wheel secured thereto. 3 and 4 are auxiliary shafts having sprocket-wheels 5 and 6, respectively. The shafts and wheels are shown diagrammatically. 7 is a drive-chain of the multi-plate type known as a "silent chain" having plate links 8 connected by pintles 9, one set of links alternating with those of an adjoining set as shown in Fig. 4. Each link has two teeth 10 which engage teeth on the sprocket-wheels.

Chains of this type should be allowed a certain amount of back-bend in order to accommodate the slack that develops in the chain through wear in the chain joints. A strand of accurately made chain of the "silent" type, running under load, can pick up vibrations in the same manner as a string of a harp under tension.

The action from the crank-shaft of an automobile engine consists of a series of impulses which time either with the explosion in the cylinders or with a torsional vibration of the crank-shaft.

As these engines are designed and do operate over a wide range of speeds, a synchronized period is frequently encountered that results in a synchronized whip of the chain, resulting in objectionable noises, high inertia strains and consequently rapid wear in the chain, and on the teeth of the sprocket-wheels.

A chain which will not bend at the joints will not whip uniformly both sides of the horizontal line.

In order to prevent the synchronized whipping or vibration of the drive-chain, check-links 11 are located at various points throughout the length of the chain as shown in Fig. 1.

The check-links may be made as shown in Fig. 5, in which 12 is the body of the link having holes 13—13 for the passage of the chain pintles. At the outer edge of the body 12 is a flange 14 which extends over adjoining links as shown in Fig. 3, preventing back-bending of the chain at this point. The check-links are assembled into the drive-chain at intervals as shown in Fig. 1. They may be used as guide links that enter grooves in the wheels and retain the chain in position laterally, as shown in Figs. 1, 2, 3, 4 and 5.

The check-links 11ª may be placed across the chain as a complete row as in Fig. 6. The check-link 11ª in this instance would be made as shown in Fig. 7, the body of the link having teeth 10ª.

The check-links may, in some instances, be made as shown in Fig. 8, the links 11ᵇ having projections 11ᶜ. When assembled, the projections 11ᶜ on links of alternate pitches come together as shown in Fig. 8, and prevent back-bending of the chain at that particular point.

In Fig. 9, lugs 11ᵉ are formed on the links 11ᵈ which extend into the liner 9ᵇ of the pintle 9ª and prevent back-bending.

It will be noticed in referring to Fig. 1 that the check-links are spaced apart at unequal intervals, and in the present instance the check-links are heavier than the other links of the chain.

I claim:—

1. A strand of drive-chain of the "silent"

type, having plate links connected by pintles; and continuously effective means located at spaced points throughout the chain for preventing back-bending of the chain at these points while leaving the intervening parts of the chain free to bend in either direction.

2. A strand of drive-chain of the "silent" type having means for preventing back-bending, said means being located at unequal intervals throughout the length of the chain.

3. A strand of drive-chain of the "silent" type including plate links; connecting pintles; and certain check-links which prevent the chain back-bending at spaced points only, and which differ in weight from the other links of the chain.

4. The combination in a drive-chain of the "silent" type, of a series of plate links; pintles connecting the links; and a check-link having a flange overlaying adjoining links and preventing the chain back-bending at the check-link.

5. The combination in a drive-chain of the "silent" type, of a series of plate links; pintles connecting the links; and check-links located at intervals in the strand of chain, each check-link having a body portion arranged to enter a groove in a sprocket wheel to retain the chain on the wheel laterally.

6. A continuous link chain of the class described comprising a plurality of links of equal weight, and links of heavier weight arranged at unequal intervals throughout its perimeter.

7. The method of preventing periodic vibration of a continuous link chain which consists in placing weights space at unequal intervals throughout its perimeter.

8. A continuous link chain of the class described comprising a plurality of links each having equal inner surfaces and equal outer surfaces, and links having equal inner surfaces equal to the inner surfaces of said first mentioned links and outer surfaces larger than the outer surfaces of said first mentioned links, arranged at unequal intervals throughout the perimeter of said chain.

HAROLD S. PIERCE.